United States Patent [19]

Brommer et al.

[11] Patent Number: 4,827,381
[45] Date of Patent: May 2, 1989

[54] SOLID ELECTROLYTICAL CAPACITOR

[75] Inventors: Gerrit Brommer; Arend Van Herwijnen, both of Zwolle; Cornelis J. Talma, Terneuzen; Herbert E. V. Veenstra, Eindhoven, all of Netherlands

[73] Assignee: U.S. Philips Corporation, New York, N.Y.

[21] Appl. No.: 233,872

[22] Filed: Aug. 16, 1988

Related U.S. Application Data

[63] Continuation of Ser. No. 15,537, Feb. 13, 1987, abandoned, which is a continuation of Ser. No. 812,149, Dec. 23, 1985, abandoned.

[30] Foreign Application Priority Data

Dec. 24, 1984 [NL] Netherlands ............ 8403928

[51] Int. Cl.$^4$ .............................................. H01G 9/00
[52] U.S. Cl. ..................................................... 361/531
[58] Field of Search ................... 361/433; 29/570

[56] References Cited

U.S. PATENT DOCUMENTS 3,819,340 6/1974 Heier et al. ..................... 29/570

Primary Examiner—L. T. Hix
Assistant Examiner—Brian W. Brown
Attorney, Agent, or Firm—Norman N. Spain

[57] ABSTRACT

A solid electrolytic capacitor having an anode body which is punched from aluminum sheet, etched and folded, and provided with a dielectric oxide layer by electrolytic oxidation, which dielectric oxide layer is covered with a semiconducting oxide-layer on which a conducting layer and leads are provided. In order to prevent contamination of the portion of the anode tag 9 to which the lead has to be welded, the anode tag 9 is designed with one or more diversions or branches 124, 25, 27, 29 in and/or out of the original plane, so that one or more apertures or recesses are formed between the relevant diversion or branch and the upper side of the anode body with a projected height of at least 0.8 mm.

1 Claim, 2 Drawing Sheets

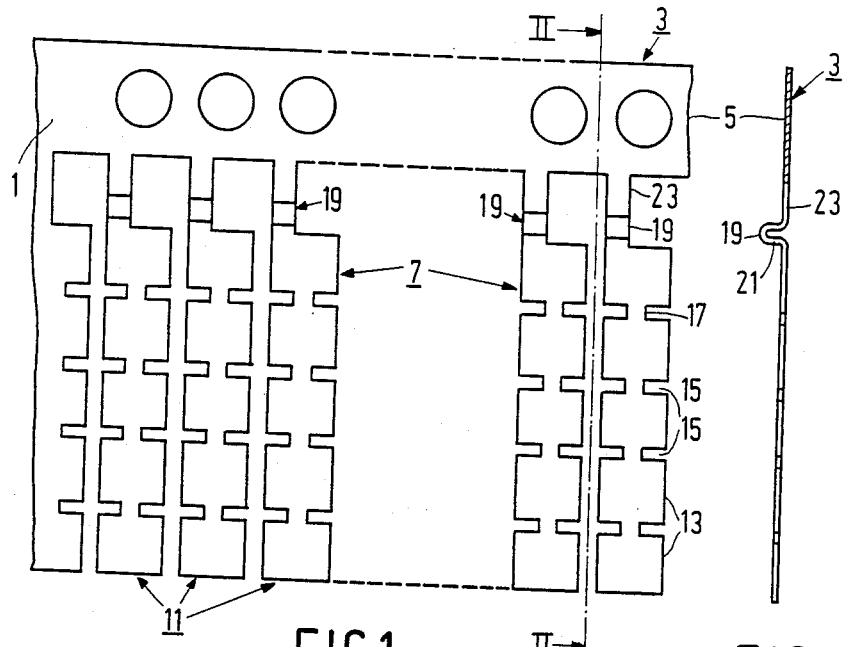
FIG.1 PRIOR ART
FIG.2
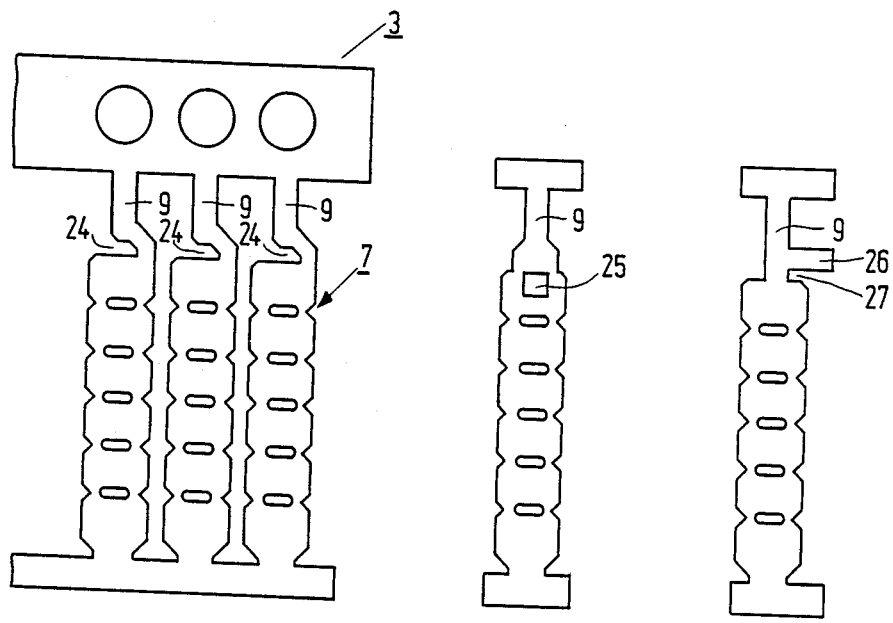
FIG.3   FIG.4   FIG.5

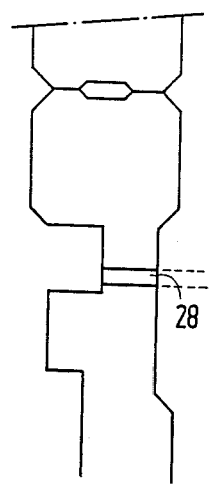
FIG.6a
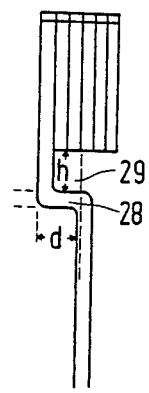
FIG.6b
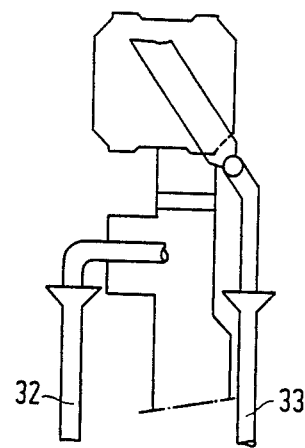
FIG.6c
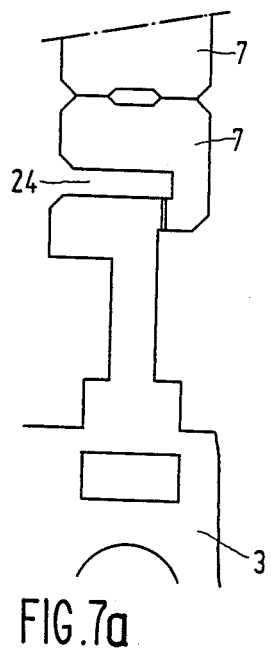
FIG.7a
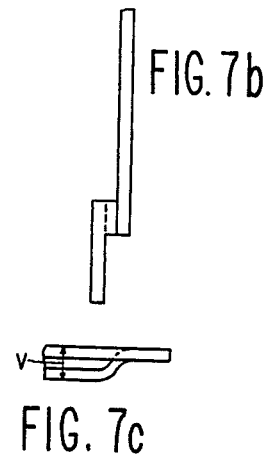
FIG.7b
FIG.7c
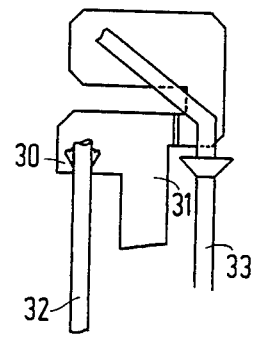
FIG.7d

SOLID ELECTROLYTICAL CAPACITOR

This is a continuation of application Ser. No. 015,537, filed Feb. 13, 1987, which was a continuation of application Ser. No. 812,149, filed Dec. 23, 1985, now abandoned.

The invention relates to a solid electrolytic capacitor having an anode body which is punched from an aluminum sheet, etched and folded, and provided with a dielectric oxide layer by electrolytic oxidation ("forming"), which dielectric oxide layer is covered with a semiconducting oxide-layer on which a conducting layer is provided, also having leads connected to an anode tab on the anode body and to the conducting layer, respectively.

In U.S. Pat. No. 3,819,340 a method of manufacturing such a capacitor is disclosed, in which anode elements are obtained by punching from an aluminum sheet strips of coherent plates which extend perpendicularly to the longitudinal direction of a carrier ribbon. The strips are connected to the carrier ribbon via a connecting tab. In order to increase the effective surface area, the plates of an aluminum strip are etched electrochemically and, subsequently, are folded one on the other so as to form a stack. The stacks thus obtained, which are interconnected by the carrier ribbon, are provided with a dielectric oxide layer by electrolytic oxidation (forming); subsequently, a semiconducting manganese dioxide layer is applied by immersing the stacks a few times in a manganese nitrate solution, followed by heating at a temperature at which pyrolysis of the manganese nitrage occurs. Post-forming of the stack is carried out after each cycle. After application of a graphite layer and a subsequent silver layer to the semiconducting layer, the stacks are separated from the carrier ribbon. Each element is provided with an anode wire, which is welded to the projecting part of the connecting tab, and with a cathode wire, which is soldered to the silver layer. Finally, the elements are provided with a lacquer layer by dipping in a lacquer bath.

Prior to the forming of the aluminum strip, a dam projecting from the plane of the carrier ribbon is formed on the connecting tab. The reason for this is that the part of the connecting tab which serves for the subsequent connection of the anode wire preferably by welding must remain bare. The dam prevents the manganese nitrate solution from creeping up during immersion and the connection tab from being covered with semiconducting oxide after the pyrolysis treatment. It also prevents the cathode material from creeping up too high when the anode stack is immersed in the solution. Such a contamination of the surface of the connection tab may cause a short-circuit and it may also hamper the formation of a suitable weld with the anode wire.

The projecting dam is bent in the connecting tab, preferably, during or immediately after the punching operation, but in any case before the forming, so that the said dam projects from the plane of the carrier ribbon with a sharp U-shaped bend. The face of the bend which faces the strip of coherent plates is perpendicular to the plates.

A disadvantage of the embodiment of this patent is that a large portion of the final height of the anode body does not contribute to the attainment of the capacitance of the capacitor. As the miniaturized versions used at present are so designed that the capacitance per volume is as great as possible, the present embodiment is not very suitable.

If the material thickness is 0.5 mm, the height of the dam will be approximately 2 mm, i.e. 4 times the thickness. Moreover, the diameter of the welding electrode used to weld the anode supply wire to the tab must be taken into account; the diameter being between 2 and 4 mm.

Moreover, in this embodiment the location where the anode tab is cut from the carrier ribbon and the location where the weld is made to the stem are aligned in the direction of the lead welded to the anode tab. This means that the cutting operation is rather time-consuming and that it has to be carried out either prior to welding, in which case the anode body would have to be held in another place, or after welding by cutting around the weld. It would be possible to weld the anode lead perpendicularly to the anode tab, however, also in this case space would be lost as the anode lead has to be bent back in a direction parallel to that of the anode stem.

It is the object of the invention to provide a capacitor having an anode body the height of which is such that it does not take up more room than necessary. Another object of the invention is to ensure that the cutting and welding operations do not hinder each other during the manufacture of the capacitor.

According to the invention there is provided a capacitor comprising an anode tab having one or more diversions or direction change of or branches in and/or out of the original plane of the anode tab whereby one or more apertures or recesses are formed in the anode tab between the relevant diversion or branch and the upper side of the anode body with a projected height of at least 0.8 mm. This can be carried out in various ways, as shown in FIG. 3 up to and including FIG. 7.

The function of the apertures or recesses thus formed is to hold the immersion liquid, so that the liquid is prevented from creeping up the anode tab and, hence, from unnecessarily contaminating the anode tab after pyrolysis.

Experiments carried out within the scope of the invention have shown that in order to achieve this a minimum height of 0.8 mm is required. If the height is chosen to be smaller the liquid is no longer prevented from going across the aperture or the recess, thus bringing about the afore-mentioned contamination.

The invention, in which there is a diversion out of the original plane, whether or not in combination with a diversion or branching in the said plane of the anode tab, offers the possibility of proportioning this diversion so that the welding area of the anode lead is in the centre line of the anode stack (see FIG. 6b). Thus, the end product is rendered more attractive in appearance.

BRIEF DESCRIPTION OF THE DRAWINGS

FIGS. 1 and 2 illustrate an intermediate product of the method of U.S. Pat. No. 3,819,340.

FIGS. 3, 4 and 5 are plan views showing an embodiment of the present invention.

FIG. 6a is a front view of another embodiment of the solid electrolytic capacitor in accordance with the present invention.

FIG. 6b is a side view of the embodiment shown in FIG. 6a.

FIG. 6c shows the anode supply-wire and cathode supply-wire of the embodiment shown in FIGS. 6a and 6b.

FIG. 7a is a front view of another embodiment of the solid electrolytic capacitor in accordance with present invention.

FIG. 7b is a side view of the embodiment shown in FIG. 7a.

FIG. 7c is a plan view of the embodiment shown in FIG. 7a.

FIG. 7d shows the anode supply-wire and cathode supply-wire of the embodiment shown in FIGS. 7a, 7b and 7c.

In the accompanying drawings, FIGS. 1 and 2 depict an intermediate product of the method in accordance with the embodiment of U.S. Pat. No. 3,819,340. FIG. 1 shows a carrier ribbon 5 having a number of strips 7 which at a later stage of the method are folded along lines 15–17 to form stacks. FIG. 2 is a side elevation along line II in FIG. 1. In the said figure, a dam 19 is visible.

FIG. 3 is the first embodiment in which an anode terminal 9 is shaped so that a recess 24 is formed; in accordance with FIG. 4, connection tab 9 is branched in the direction of the anode plates such that an aperture 25 having a side of 2 mm is enclosed. In FIG. 5, connection tab 9 has a lateral branch 26, thus a recess 27 having a height of 1 mm is formed.

In accordance with a further elaboration of the capacitor of the invention, the connecting tab comprises a curvature from the original plane towards the exterior, if necessary, in combination with a curvature in the plane of the anode tab. This further enlarges the diversion; moreover, it has the advantage that the connecting tab can be positioned in the middle of the product stack so that the leads are symmetrical with respect to the capacitor body.

FIG. 6a is a front view of an embodiment and FIG. 6b is a side view in accordance with which the connecting tab comprises a bend, having a depth d=1.3 mm, which is perpendicular to the longitudinal direction, such that a recess 29 having a height h=1.2 mm is formed with the anode stack. FIG. 6c shows the folded stack after the semiconducting oxide and the conducting layer with the welded-on anode supply-wire 32 and the soldered-on cathode supply-wire 33, have been provided.

FIG. 7a is a front view, FIG. 7b a side view and FIG. 7c a plan view of another embodiment in which the anode tab has been bent in the longitudinal direction. A recess 24 has a height of 1.2 mm, offset $v$ amounts to 3×the plate thickness, that is to say 1.5 mm. FIG. 7d shows the bond of the leads 32 and 33.

In all these embodiments, the manganese nitrate liquid hardly rises to a level above the recess or aperture during immersion, hence a completely clean anode connecting tag is obtained after pyrolysis. Also after immersion in a graphite suspension and a silver suspension, the tab remains clean.

A diversion having a lateral branch, as shown in FIGS. 3, 5 and 7, enables the weld on the anode tab (for example, location 30 in FIG. 7) and the area where the anode tag is cut from the carrier ribbon (for example, location 31 in FIG. 7) to be situated at different locations.

Starting from a punched material comprising a carrier ribbon (3) and strips (7) as shown in FIGS. 2 up to and including 7, solid electrolytic capacitors are manufactured in accordance with the method described in U.S. Pat. No. 3,819,340. In comparison with the lacquer-coated capacitors in accordance with the said U.S. patent specification, which are manufactured starting from a carrier ribbon with strips as shown in FIG. 1 and the anode connecting tags of which are folded to obtain dams, the height is reduced by 1.5 to 2 mm for each of the embodiments of the invention described herein, using stack elements measuring 4×6 mm.

What is claimed is:

1. A solid electrolytic capacitor having an anode body which body is punched from aluminum sheet, etched and folded, and provided with a dielectric oxide layer by electrolytic oxidation, which dielectric oxide layer is coated with a semiconducting oxide layer, upon which semiconducting oxide layer a conducting layer is provided, and which anode body is provided with leads connected to an anode tab present on said anode body and to said conducting layer, respectively, characterized in that said anode tab has one or more branches or diversions lying within its original plane whereby one or more apertures or recesses are formed in the anode tab between the relevant diversion or branch and the upper side of the anode body with a projected height of said aperture or recess of at least 0.8 mm.

* * * * *